United States Patent [19]

Momura et al.

[11] 4,129,672
[45] Dec. 12, 1978

[54] AUTO CEILING PANEL AND ITS MANUFACTURING PROCESS

[75] Inventors: Takao Momura; Yoshiro Umemoto, both of Nagoya; Tatsuo Sakamoto, Okazaki, all of Japan

[73] Assignee: Toyota Jidosha Kogyo Kabushiki Kaisha, Aichi, Japan

[21] Appl. No.: 895,388

[22] Filed: Apr. 11, 1978

[30] Foreign Application Priority Data

May 12, 1977 [JP] Japan .................................. 52-54664

[51] Int. Cl.² ....................... B62D 25/06; B32B 3/10; B32B 3/26
[52] U.S. Cl. .................................... 428/138; 156/219; 156/245; 156/252; 156/306; 181/290; 296/137 A; 264/321; 428/158; 428/213; 428/315
[58] Field of Search ....................... 296/137 A, 137 R; 181/288, 290-294; 156/219, 252, 253, 245, 306; 428/137, 138, 158, 159, 213-215, 310, 311, 313, 315

[56] References Cited

U.S. PATENT DOCUMENTS

| 3,647,588 | 3/1972 | Greig | 428/313 |
| 3,697,126 | 10/1972 | Tiffin et al. | 428/315 |
| 3,954,537 | 5/1976 | Alfter et al. | 428/315 |
| 3,966,526 | 6/1976 | Doerfling | 156/252 |
| 4,073,991 | 2/1978 | Focht | 428/315 |

Primary Examiner—William J. Van Balen
Attorney, Agent, or Firm—Oblon, Fisher, Spivak, McClelland & Maier

[57] ABSTRACT

Auto ceiling panel which represents a metal lath coated with plastics around the meshes, both sides of said metal lath being attached by thermal fusion with a foamed polyethylene layer having numerous through holes and with a foamed urethane slab having continuous bubbles, characterized by high permeability and high open rate; and the manufacturing process of this auto ceiling panel.

33 Claims, 8 Drawing Figures

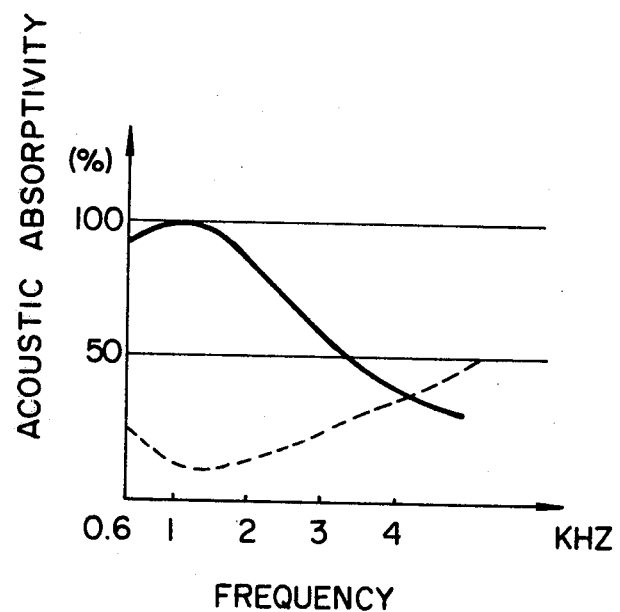
F I G. 8

AUTO CEILING PANEL AND ITS MANUFACTURING PROCESS

BACKGROUND OF THE INVENTION (1) Field of the Invention

The present invention relates to a highly acoustical auto ceiling panel and its manufacturing process.

(2) Description of the Prior Art

The conventional auto ceiling panel is a three-layer structure which represents a metal lath attached on both sides with polyethylene foams having isolated bubbles by thermal fusion; or a four-layer structure which represents a metal lath sandwiched between a vinyl chloride sheet-coated polyethylene foam and another polyethylene foam.

In such luminated structures (of three layers or four layers), the heat insulating effect and the safety to the human body may be fully assured, but on account of the bubbles in the polyethylene foam being isolated, the effect of absorbing the interior noise is not fully assured.

It has been known that a good effect of absorbing the sound will be secured when the auto ceiling panel is provided with through holes. Provision of such through holes in such a three-layer or four-layer panel will be hindered by the presence of a metal lath between polyethylene foams; and after lamination of these foams, it will be difficult to bore the through holes.

For these reasons it is the present practice to bore through holes separately in each polyethylene foam and thereafter laminate each foam on both sides of the metal lath, but even in this practice it is difficult to make lamination with the same pattern between top and bottom with the result that a very few through holes running through both polyethylene foams are obtained and thus the sound-absorbing effect is not so good for all the trouble of working.

SUMMARY OF THE INVENTION

The primary object of the present invention is to provide a highly acoustical auto ceiling panel free from the drawback of the conventional auto ceiling panel, which can well absorb the interior noise without sacrificing the heat insulating effect and the safety to the human body characterizing the conventional auto ceiling panel.

Another object of the present invention is to provide the manufacturing process of a highly acoustical auto ceiling panel which can easily produce numerous through holes in the panel.

BRIEF EXPLANATION OF THE DRAWINGS

FIG. 8 is a diagram illustrating the accorstivity rate of said auto ceiling panel in terms of frequency.

DESCRIPTION OF THE PREFERRED EMBODIMENT

The auto ceiling panel according to the present invention is essentially a lamination of a foamed plastic layer having numerous through holes and an embossed pattern on its surface or a foamed plastic layer attached with a plastic film having numerous through holes at the same positions as in the former plastic layer, and another foamed plastic layer with continuous bubbles, with a metal lath coated with plastics around the meshes being sandwiched between said two foamed plastic layers.

The manufacturing process of this auto ceiling panel essentially comprises the following steps: punching numerous through holes by a punching machine on a foamed plastic layer attached on one side with a plastic film; sandwiching by thermal fusion a metal lath coated with plastics around the meshes between said foamed plastic layer and another foamed plastic layer with continuous bubbles; molding the lamination thus yielded to a specific profile by cold press-molding or giving an embossed pattern to one side of said foamed plastic layer by an embossing machine; and then boring numerous through holes in said foamed plastic layer by a punching machine; or boring numerous through holes in a foamed plastic layer by a punching machine; giving an embossed pattern to one side of said foamed plastic layer by an embossing machine; sandwiching by thermal fusion between the other side of said foamed plastic layer and another foamed plastic layer with continuous bubbles a metal lath coated with plastics around the meshes; and molding to a specific profile the lamination thus yielded, by cold press-molding.

Next an auto ceiling panel as one embodiment of the present invention is to be described in detail.

Figure 1:
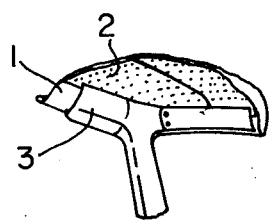
FIG. 1 is an oblique view of a part of the ceiling of an automobile built of an auto ceiling panel according to the present invention.

In FIG. 1, 1 is the auto roof, the interior side of which is built of the ceiling panel 2 and supported with the roof side rail 3.

Figure 2:
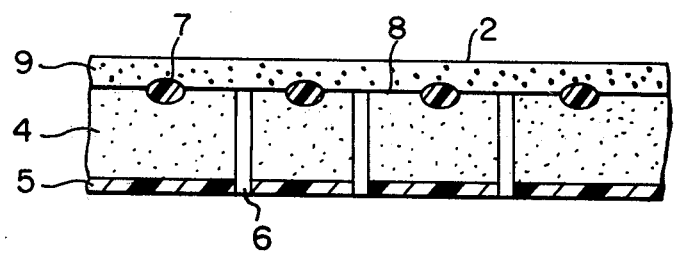
FIG. 2 is a longitudinal section view of an auto ceiling panel according to the present invention.
Figure 3:
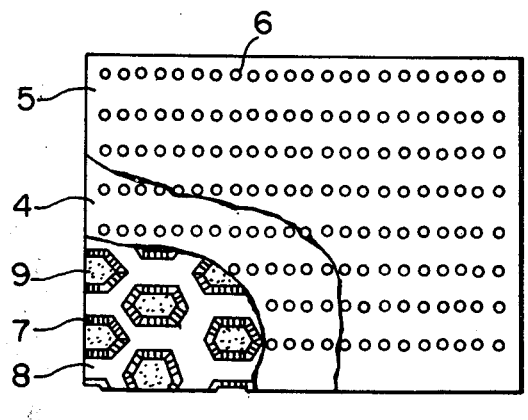
FIG. 3 is a partially fragmentary plan view of said auto ceiling panel.

As indicated in FIGS. 2 and 3, the ceiling panel 2 has a foamed polyethylene layer 4 of, say, 1.0–8.0mm thickness (specific gravity 0.02–0.1) and an underlying vinyl chloride sheet 5 of 0.01–0.5mm thickness with an embossed pattern. Said foamed polyethylene layer 4 attached with said vinyl chloride sheet 5 is bored with numerous through holes 6 of, say, 0.1–10mm diameter to an open rate of 0.5–20%. To the top side of said foamed polyethylene layer 4 is thermally fused a metal lath (0.5–1.5mm thick) coated with polyethylene 7 to a film of b 1–100$\mu$ thickness around the meshes. Said metal lath 8 is also laminated by thermal fusion with a foamed urethane slab 9 (specific gravity 0.01–0.5) of 1.0–8.0mm thickness with continuous permeable bubbles.

Instead of using an embossed vinyl chloride sheet 5, said foamed polyurethane layer 4 may be directly embossed with a pattern.

Next referring to FIGS. 4 to 7, the manufacturing process of a ceiling panel using a foamed polyethylene layer directly embossed with a pattern instead of a vinyl chloride sheet is to be described.

Figure 4:
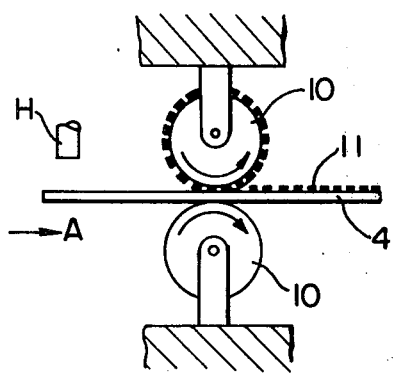
FIG. 4 is a diagram explaining the embossing step in the manufacture of said auto ceiling panel.
Figure 5:
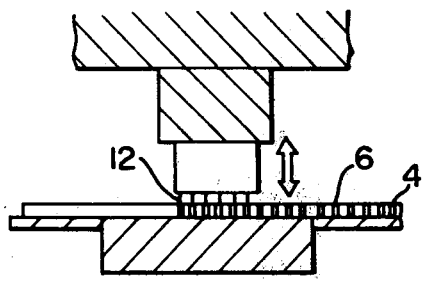
FIG. 5 is a diagram explaining the punching step in the manufacture of said auto ceiling panel.

FIG. 4 illustrates an embossing step (a pattern-giving step), in which a 1.0–8.0mm thick polyethylene layer 4 (specific gravity 0.02–0.1) with one side being heated by a heater H is put through an embossing roll 10 in the arrow direction, whereby an embossed pattern 11 is given to the surface. In the following step of punching by a punching machine 12, as illustrated in FIG. 5, said polyethylene layer 4 is bored with numerous through holes 6 of 0.1-10mm diameter to an open rate of 0.5-20%.

If thereby the through holes 6 spoil the appearance, permeable leather may be applied for improvement. A polyethylene layer 4 attached with a vinyl chloride sheet 5 is also bored on both sides with through holes 6 by the punching machine 12. Said embossing step in FIG. 4 and said punching step in FIG. 5 may be reversed in order.

The metal lath 8 must have its meshes peripherally coated with plastics 7. The conventional methods for this coating are fluid immersion coating, spray coating, electrostatic powder coating, etc.; and any of these methods will be available. In one embodiment of the present invention, polyethylene powder of 80 mesh average is electrostatically deposited on a metal lath 8 of 0.5-1.5mm thickness. Said lath is placed in an atmosphere of about 160° C. to fuse polyethylene powder to said metal lath, thereby forming a polyethylene film of 1-1000μ thickness thereon.

Figure 6:
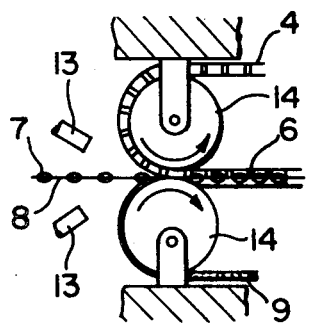
FIG. 6 is a diagram explaining the laminating step in the manufacture of said auto ceiling panel.
Figure 7:
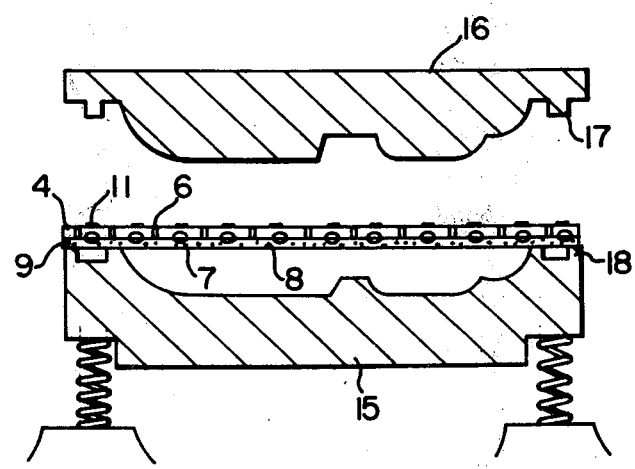
FIG. 7 is a diagram explaining the cold press-molding step in the manufacture of said auto ceiling panel.

The metal lath 8 thus yielded is, as illustrated in FIG. 6, sandwiched between said foamed plastic layer 4 embossed and having through holes 6 and a foamed urethane slab 9 of 1.0-8.0mm thickness and 0.01-0.05 specific gravity with continuous bubbles, to be heated by the heater 13 (to about 200° C.) and laminated by thermal fusion in the roll 14. Such lamination yields an auto ceiling panel as illustrated in FIG. 1. An auto ceiling panel of this laminated structure is rigid and soundproof enough to make a highly acoustical material for auto ceiling.

Next the ceiling panel thus laminated is cut to a specific size and then molded to a specific profile by a cold press-molding machine illustrated in FIG. 5.

The press molding machine consists of a stationary bottom mold 15, a top mold 16 vertically movable in relation to said bottom mold, an anti-wrinkle male member 17 and a female member 18. The ceiling panel cut to a specific size is placed with its embossed surface 11 upside, on the bottom mold 15. Thereupon the top mold 16 and the anti-wrinkle male member 17 are simultaneously lowered to squeeze the fringe of said ceiling panel between said male member 17 and said female member 18. Thus said panel can be molded to a specific profile without a wrinkle by the top mold 16 and the bottom mold 15.

This molding can be applied also to a ceiling panel illustrated in FIG. 2.

The reasons for dimensional limitations specified in the present invention are now to be explained.

As for the thickness of the foamed polyethylene layer 4 in the present invention, at less than 1.0mm the meshes become so prominent as to spoil the appearance of the lath, while at more than 8.0mm the lath becomes heavy, resulting in a cost-up.

As for the size of holes bored in the foamed polyethylene layer 4 and the vinyl chloride sheet 5, at less than 0.1mm the acoustical effect drops, while at more than 10.0mm the appearance is injured.

As for the open rate in the foamed polyethylene layer 4 and the vinyl chloride sheet 5, at less than 1% a sufficient acoustical effect cannot be obtained, while at more than 20% the appearance becomes poor.

As for the film thickness of polyethylene 7 with which the metal lath 8 is coated around the meshes, at less than 1μ the bondability in thermal fusion between the foamed polyethylene layer 4 and the foamed urethane slab 9 with continuous bubbles deteriorates, while at more than 1000μ the bondability is not so much increased as might be expected from coating.

As for the thickness of the metal lath 8, at less than 0.5mm the ceiling panel as a member of auto roof becomes weak, while at more than 1.5mm it becomes not only heavy but also poorly workable in press molding.

As for the thickness of the foamed urethane slab 9 with continuous bubbles, at less than 1.0mm the acoustical effect is poor, while at more than 8.0mm the acoustical effect is not so good as might be expected from an increased thickness and the result is heaviness and cost-up.

As elaborated in the above, the auto ceiling panel according to the present invention excels in the acoustical effect over the conventional one. The test results are given in FIG. 8, which illustrates the acoustical characteristic of the ceiling panel in terms of frequency, the solid line representing the characteristic of the ceiling panel 2 according to the present invention and the broken line representing the characteristic of a conventional four-layer ceiling panel. As seen from the above, a far higher acoustical effect is obtained by the present invention, which is the result of a necessary and sufficient number of through holes 6 being bored in the foamed polyethylene layer 4 and the vinyl chloride sheet 5 without being hindered by the metal lath 8 and of a foamed urethane slab 9 with continuous bubbles being employed.

The following benefits accrue from the manufacturing process of an auto ceiling panel according to the present invention:

(1) An embossed foamed polyethylene layer of FIG. 4 constitutes a pleasant-looking surface.

(2) A foamed polyethylene layer of FIG. 5 bored with numerous through holes is far superior in the acoustical characteristic to one with no holes.

(3) The metal lath coated with polyethylene, on account of its meshes being left intact, is permeable enough to increase the sound-absorbing effect. p1 (4) A foamed urethane slab with continuous bubbles which is thermally fused to the back side of the metal lath is so permeable on account of said continuous bubbles that there is no need of boring the conventional foamed polyethylene layer and moreover the acoustical effect can be improved. Presence of said foamed urethane slab with continuous bubbles facilitates the handling of the finished panel in transportation.

(5) In the ceiling panel according to the present invention, in which a foamed urethane slab of low specific gravity with continuous bubbles is employed instead of a foamed polyethylene layer, the weight can be reduced and the punching step can be dispensed with.

It goes without saying that the auto ceiling panel according to the present invention is available not only as the auto roofing, but also as auto lining or building wall.

We claim:

1. Auto ceiling panel comprising:
 a metal lath coated with plastics around the meshes;
 a foamed plastic layer with numerous through holes which is thermally fused to one side of said metal lath;

and another foamed plastic layer with continuous bubbles which is thermally fused to the other side of said metal lath.

2. Auto ceiling panel of claim 1, wherein an embossed pattern is given to the interior side surface of said foamed plastic layer with numerous through holes.

3. Auto ceiling panel of claim 1, wherein the interior side surface of said foamed plastic layer with numerous through holes is attached with a plastic film with numerous through holes coaxial with, and of the same diameter as, the through holes in said foamed plastic layer.

4. Auto ceiling panel of claim 3, wherein said plastic film is a vinyl chloride sheet.

5. Auto ceiling panel of claim 4, wherein said vinyl chloride sheet is 0.01–0.5mm thick.

6. Auto ceiling panel of claim 1, wherein the numerous through holes bored in said foamed plastic layer are 0.1–10mm in diameter.

7. Auto ceiling panel of claim 1, wherein the numerous through holes in said foamed plastic layer are bored to an open rate of 0.5–20%.

8. Auto ceiling panel of claim 1, wherein said plastics with which said metal lath is coated is polyethylene of 1–1000μ thick.

9. Auto ceiling panel of claim 1, wherein said metal lath is 0.5–1.5mm thick.

10. Auto ceiling panel of claim 1, wherein said foamed plastic slab with continuous bubbles is a permeable foamed urethane.

11. Auto ceiling panel of claim 10, wherein said foamed urethane slab is 1.0–8.0mm thick.

12. Auto ceiling panel of claim 10, wherein said foamed urethane slab is 0.01–0.05 in specific gravity.

13. Auto ceiling panel manufacturing process characterized by comprising the following steps:
of attaching a plastic film to one side of a foamed plastic layer;
of boring by a punching machine numerous through holes on said foamed plastic layer attached with said plastic film such that said holes run through both said foamed plastic layer and said plastic film;
of forming a laminated structure by attaching a foamed plastic layer with continuous bubbles to the opposite side to said plastic film-coated side of the former foamed plastic layer, sandwiching a metal lath coated with plastics around the meshes between said foamed plastic layer with continuous bubbles and said foamed plastic layer, and thermally fusing both foamed plastic layers to said metal lath;
and of molding said laminated structure to a profile fitting the auto ceiling by cold press molding.

14. Auto ceiling panel manufacturing process of claim 13, wherein a pattern is embossed on the interior side surface of said plastic film before it is attached to the foamed plastic layer.

15. Auto ceiling panel manufacturing process of claim 13, wherein said plastic film is a vinyl chloride sheet.

16. Auto ceiling panel manufacturing process of claim 15, wherein said vinyl chloride sheet is 0.01–0.5mm thick.

17. Auto ceiling panel manufacturing process of claim 13, wherein the through holes bored in said plastic film-coated foamed plastic layer are 0.1–10mm in diameter.

18. Auto ceiling panel manufacturing process of claim 13, wherein said through holes are bored to an open rate of 0.5–20%.

19. Auto ceiling panel manufacturing process of claim 13, wherein said plastics with which said metal lath is coated is polyethylene 1–1000μ thick.

20. Auto ceiling panel manufacturing process of claim 13, wherein said metal lath is 0.5–1.5mm thick.

21. Auto ceiling panel manufacturing process of claim 13, wherein said foamed plastic layer with continuous bubbles is a permeable foamed urethane slab.

22. Auto ceiling panel manufacturing process of claim 21, wherein said foamed urethane slab is 1.0–8.0mm thick.

23. Auto ceiling panel manufacturing process of claim 21, wherein said foamed urethane slab is 0.01–0.05 in specific gravity.

24. Auto ceiling panel manufacturing process characterized by comprising the following steps:
of embossing a pattern on one side of a foamed plastic layer and boring numerous through holes therein;
of attaching a foamed plastic layer with continuous bubbles to the other side of said foamed plastic layer, sandwiching a metal lath coated with plastics around the meshes between said foamed plastic layer with continuous bubbles and said foamed plastic layer, and thermally fusing both foamed plastic layers to said metal lath to yield a laminated structure;
and of molding said laminated structure to a profile fitting the auto ceiling by cold press molding.

25. Auto ceiling panel manufacturing process of claim 24, wherein said foamed plastic layer is embossed with a pattern by an embossing machine and thereafter bored with through holes by a punching machine.

26. Auto ceiling panel manufacturing process of claim 24, wherein said foamed plastic layer is bored with through holes by a punching machine and thereafter embossed on one side with a pattern by an embossing machine.

27. Auto ceiling panel manufacturing process of claim 24, wherein the through holes bored in said foamed plastic layer are 0.1–10mm in diameter.

28. Auto ceiling panel manufacturing process of claim 24, wherein said through holes are bored to an open rate of 0.5–20%.

29. Auto ceiling panel manufacturing process of claim 24, wherein said plastics with which said metal lath is coated is polyethylene 1–1000μ thick.

30. Auto ceiling panel manufacturing process of claim 24, wherein said metal lath is 0.5–1.5mm thick.

31. Auto ceiling panel manufacturing process of claim 24, wherein said foamed plastic layer with continuous bubbles is a permeable foamed urethane slab.

32. Auto ceiling panel manufacturing process of claim 24, wherein said foamed urethane slab is 1.0–8.0mm thick.

33. Auto ceiling panel manufacturing process of claim 24, wherein said foamed urethane slab is 0.01–0.05 in specific gravity.

* * * * *